United States Patent
Naim et al.

(10) Patent No.: US 9,408,223 B2
(45) Date of Patent: Aug. 2, 2016

(54) SYSTEMS AND METHODS OF MANAGING FREQUENCY BAND SELECTION

(71) Applicant: Sprint Spectrum LP, Overland Park, KS (US)

(72) Inventors: Muhammad Naim, Sterling, VA (US); Daniel Vivanco, Sterling, VA (US); Kevin Hart, Oakton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 265 days.

(21) Appl. No.: 13/902,294

(22) Filed: May 24, 2013

(65) Prior Publication Data
US 2015/0351109 A1     Dec. 3, 2015

(51) Int. Cl.
*H04B 7/00*     (2006.01)
*H04W 72/08*    (2009.01)
*H04W 36/30*    (2009.01)
*H04W 36/06*    (2009.01)

(52) U.S. Cl.
CPC ............ *H04W 72/085* (2013.01); *H04W 36/30* (2013.01); *H04W 36/06* (2013.01)

(58) Field of Classification Search
None
See application file for complete search history.

(56) References Cited

U.S. PATENT DOCUMENTS

| | | | |
|---|---|---|---|
| 7,317,419 B2 | 1/2008 | Sugar et al. | |
| 8,195,251 B2 | 6/2012 | Bakthavathsalu et al. | |
| 8,264,402 B2 | 9/2012 | Kaiser et al. | |
| 2009/0047984 A1* | 2/2009 | Gollamudi | H04W 72/048 455/513 |
| 2011/0235515 A1 | 9/2011 | Dreyfus et al. | |
| 2011/0237246 A1 | 9/2011 | Sen | |
| 2012/0163344 A1 | 6/2012 | Bakthavathsalu et al. | |
| 2013/0039391 A1 | 2/2013 | Skarp | |
| 2013/0237245 A1* | 9/2013 | Tinnakornsrisuphap | H04W 64/00 455/456.1 |
| 2014/0334320 A1* | 11/2014 | Liu | H04W 52/242 370/252 |
| 2015/0004971 A1* | 1/2015 | Yilmaz et al. | 455/434 |

OTHER PUBLICATIONS

International Preliminary Report on Patentability for PCT/US2014/038139 mailed Dec. 3, 2015.
International Search Report and Written Opinion for PCT/US2014/038139 mailed Nov. 27, 2014.

* cited by examiner

*Primary Examiner* — Edward Urban
*Assistant Examiner* — Mohammed Rachedine

(57) ABSTRACT

In systems and methods of managing frequency band selection for a wireless device, a first signal level of a first frequency band and a second signal level of a second frequency band received at a wireless device are monitored, wherein the first frequency band comprises a lower frequency band than the second frequency band. A first signal level difference is determined between the first signal level and the second signal level, and the wireless device is instructed to communicate with the access node over the second frequency band when the first signal level difference meets a first signal level difference criteria based on a decrease of the second signal level.

14 Claims, 9 Drawing Sheets

| | t0 | t1 | t2 | t3 | t4 |
|---|---|---|---|---|---|
| SL 302 | -10% | -10% | -10% | -11% | -12% |
| SL 304 | -11% | -11% | -11% | -15% | -20% |

| | t0 | t1 | t2 | t3 | t4 |
|---|---|---|---|---|---|
| 602 | -10% | -10% | -10% | -11% | -12% |
| 606 | -9% | -9% | -9% | -10% | -10% |
| 604 | -11% | -11% | -11% | -15% | -20% |

US 9,408,223 B2

SYSTEMS AND METHODS OF MANAGING FREQUENCY BAND SELECTION

TECHNICAL BACKGROUND

Multiband wireless communication systems are capable of supporting communication with wireless devices over one or more carriers or frequency bands. Such communication systems can include a plurality of access nodes in relative proximity. Transceivers of a plurality of frequency bands can also be co-located at an access node. Each frequency band may have different characteristics, including coverage, available and total capacity, transmission schemes, and the like. In general, due to physical propagation characteristics, signal levels of higher frequency bands tend to fall off more rapidly than those of lower frequency bands. Higher frequency bands are also more susceptible to path losses due to object interference, such as walls, partitions, and other objects. For example, higher frequency bands tend to penetrate walls and other structures less effectively than lower frequency bands.

Overview

In operation, a first signal level of a first frequency band and a second signal level of a second frequency band which are each received at a wireless device from an access node are monitored. The first frequency band comprises a lower frequency band than the second frequency band. A first signal level difference between the first signal level and the second signal level is determined. When the first signal level difference meets a first signal level difference criteria based on a decrease of the second signal level, the wireless device is instructed to communicate with the access node over the second frequency band. In an embodiment, the wireless device is instructed to communicate over the second frequency band when the second signal level meets a signal level threshold and when the first signal level difference meets a first signal level difference criteria based on a decrease of the second signal level. In an embodiment, the first signal level difference criteria comprises a threshold rate of change over a predetermined period of time.

DETAILED DESCRIPTION

Figure 1:
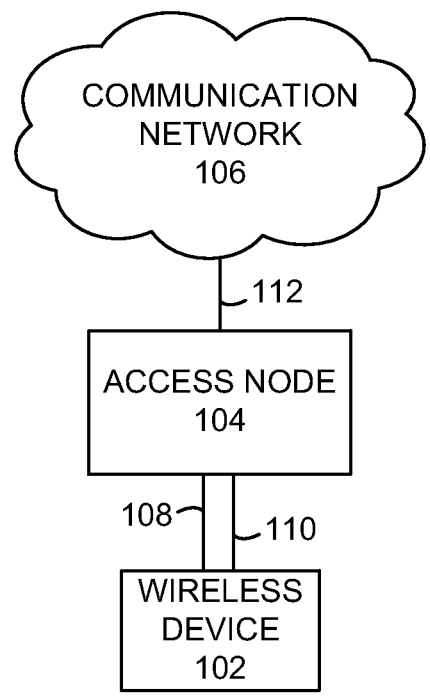
FIG. 1 illustrates an exemplary communication system to manage frequency band selection for a wireless device.

FIG. 1 illustrates an exemplary communication system 100 to manage frequency band selection for a wireless device comprising wireless device 102, access node 104 and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 108 and over communication link 110. Communication links 108 and 110 can each correspond to a frequency band. In an embodiment, communication link 108 can correspond with a first frequency band, and communication link 110 can correspond with a second frequency band at a lower frequency than the first frequency band.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108, 110 and 112 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Frequency bands in multiband wireless communication systems may have different characteristics, including coverage, available and total capacity, transmission schemes, and the like. Different frequency bands typically have different physical propagation characteristics, and higher frequency band signal levels tend to decrease more rapidly than lower frequency band signal levels. Higher frequency bands are also more susceptible than lower frequency bands to path losses due to object interference, such as walls, partitions, and other objects.

Further, higher frequency band signal levels tend to decrease more rapidly than lower frequency band signal levels when a wireless device moves into an area where higher frequency band penetration is impeded. The rapid fall off in higher frequency band signal levels can cause, for example, the degradation of service to or performance of wireless device applications which require a relatively high data rate or data throughput. In addition, wireless communication link load can be increased as a wireless device is assigned a lower modulation and coding scheme (MCS), which tends to decrease data throughput to the wireless device, and may also increase an amount of repetitive data transmitted as part of an error correction mechanism.

In operation, a first signal level of a first frequency band and a second signal level of a second frequency band are monitored, based on signals received at a wireless device from an access node. For example, signal levels received at wireless device 102 corresponding to signals transmitted over communication links 108 and 110 can be monitored. In an embodiment, the first frequency band can be a lower frequency band than the second frequency band. Further, a difference between the first signal level and the second signal level can be determined. In an embodiment, the difference between the first signal level and the second signal level can be determined over a period of time. When the second signal level (of the second frequency band) decreases such that difference of the first signal level and the second signal level meets a first signal level difference criteria, the wireless device can be instructed to communicate with the access node over the second frequency band.

Figure 2:
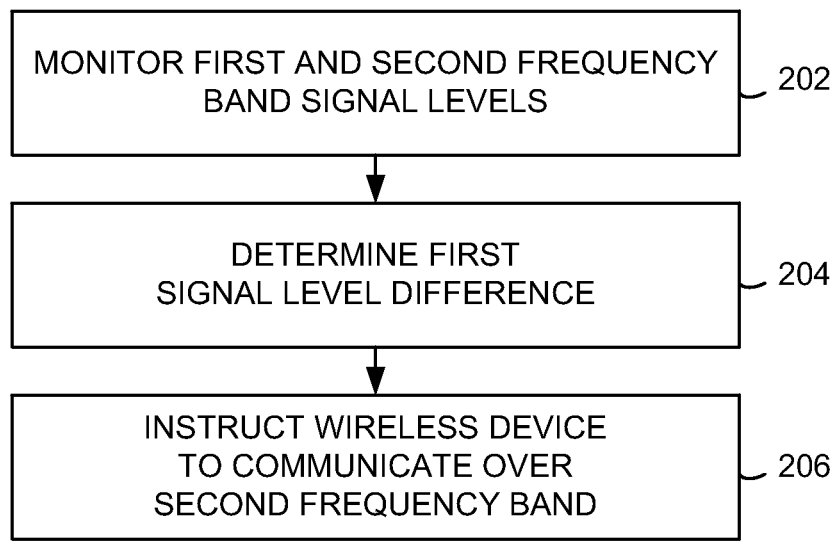
FIG. 2 illustrates an exemplary method of managing frequency band selection for a wireless device.
Figures 3A, 3B:
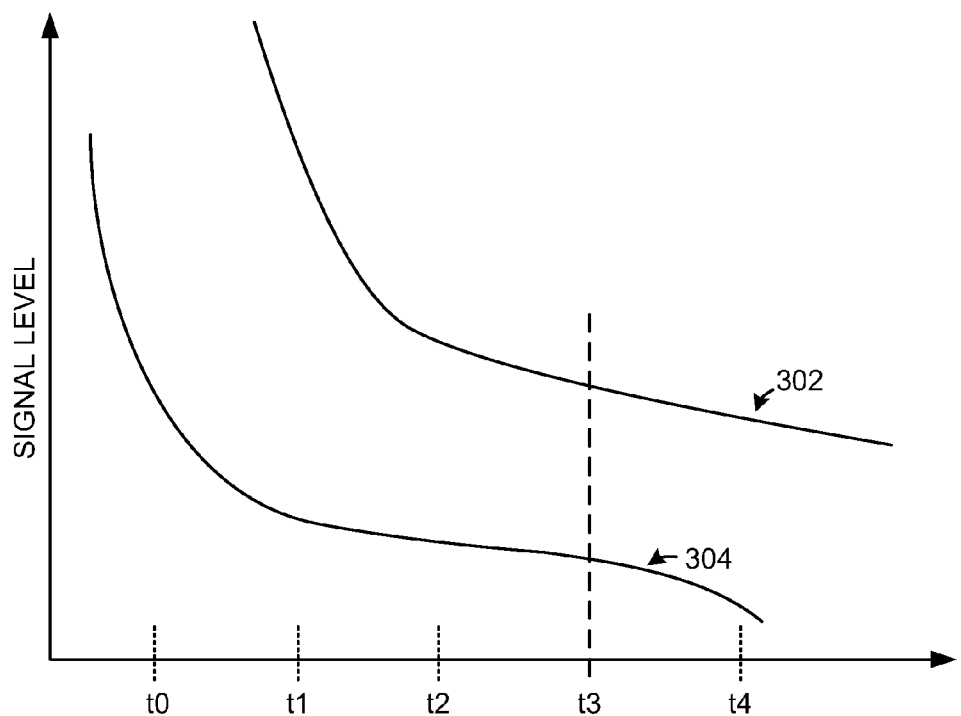
FIG. 3A illustrates exemplary power levels of frequency bands over time.
FIG. 3B illustrates exemplary signal levels of frequency bands.

FIG. 2 illustrates an exemplary method of managing frequency band selection for a wireless device. In operation 202, a first signal level of a first frequency band and a second signal level of a second frequency band are monitored, wherein the first signal level and the second signal level are received at a wireless device from an access node, and wherein the first frequency band comprises a lower frequency band than the second frequency band. For example, with reference to FIG. 3A, a first signal level 302 and a second signal level 304 can be received at wireless device 102, and the signal levels can be monitored. Monitoring can be performed at a network element which receives signal level information from wireless device 102 and/or the signal levels can be monitored at wireless device 102. First signal level 302 can correspond with wireless communication link 108, and second signal level 304 can correspond with wireless communication link 110. As illustrated in FIG. 3A, first signal level 302 can be greater than second signal level 304. First signal level 302 can correspond with a lower frequency band than second signal level 304. For example, signal level 302 can correspond with an 800 MHz frequency band, and signal level 304 can correspond with a 2.5 GHz frequency band. Signal levels 302 and 304 are decreasing over time, as illustrated by the decreasing signal levels at times t0-t4. Such decreasing signal levels can indicate that wireless device 102 is experiencing fading conditions of wireless communication link 108 (and/or wireless communication link 110), possibly due to wireless device 102 moving away from access node 104, degrading radio frequency conditions, and the like.

Returning to FIG. 2, a first signal level difference between the first signal level and the second signal level is determined (operation 204). In an embodiment, the signal level difference can be determined at a point in time. For example, FIG. 3A illustrates points in time t0, t1, t2, t3 and t4. Based on the determined respective signal levels, a signal level difference can be determined. For example, FIG. 3B illustrates variations over time (i.e., rates of change) for the signal levels 302 and 304 determined at times t0, t1, t2, t3 and t4, respectively. In an embodiment, signal levels 302 and 304 can be monitored for a period of time, for example, for a period of time from point t0 to point t4.

Referring again to FIG. 2, in operation 206, the wireless device is instructed to communicate with the access node over the second frequency band when the first signal level difference meets a first signal level difference criteria based on a decrease of the second signal level. For example, based on a decrease in signal level 304, wireless device 102 can be instructed to communicate with access node 104 over wireless communication link 110. Based on the signal levels determined at t0-t4 (FIGS. 3A and 3B) it can be determined (for example, at point t3) that the signal level difference meets a threshold signal level difference. The signal level difference can also, for example, meet a threshold signal level rate of change as compared with previous time points. For example, the rate of change of the signal level difference from points t3-t4 can be greater than the rate of change of the signal level difference from points t0-t3. Further, the rate of change from points t3-t4 can meet a threshold rate of change.

When wireless device 102 moves away from access node 104, a consistent gradual decrease in signal levels 302 and 304 can be expected. Higher frequency band signal levels tend to decrease more rapidly than lower frequency band signal levels when a wireless device moves into an area where higher frequency band penetration is impeded. For example, the signal level difference evident at point t3 (or the rate of change evident from points t3-t4) can indicate, for example, that wireless device 102 has entered a building, passed behind a structure relative to access node 104, or otherwise entered an area where higher frequency bands are more susceptible than lower frequency bands to signal level loss.

In an embodiment, when the signal level difference meets the signal level difference criteria (for example, at point t3, or from points t3-t4), the wireless device is instructed to communicate with the access node over the second frequency. For example, when the signal level difference meets the signal level difference criteria, it can be determined that wireless device 102 has entered a structure at point t3. It can be anticipated that wireless device users who are less mobile (i.e., more stationary) than other wireless device users may use wireless device applications with greater data rate or throughput requirements than wireless devices users who are more mobile. For example, relatively stationary wireless device users may tend to use more streaming multimedia services or other high bandwidth applications than relatively mobile users. To improve a data rate or throughput received by a relatively stationary wireless device, the wireless device can be instructed to communicate with the access node over the second frequency band when the first signal level difference meets a first signal level difference criteria based on a decrease of the second signal level. In an embodiment, the second signal level of the second frequency band is also compared to a signal level threshold, and the wireless device is instructed to communicate over the second frequency band when the second signal level meets a signal level threshold and when the first signal level difference meets a first signal level difference criteria based on a decrease of the second signal level. The signal level threshold can comprise a minimum data rate, a maximum permitted data delay, a minimum throughput, a maximum error rate, a maximum data loss rate, and the like.

Figure 4:
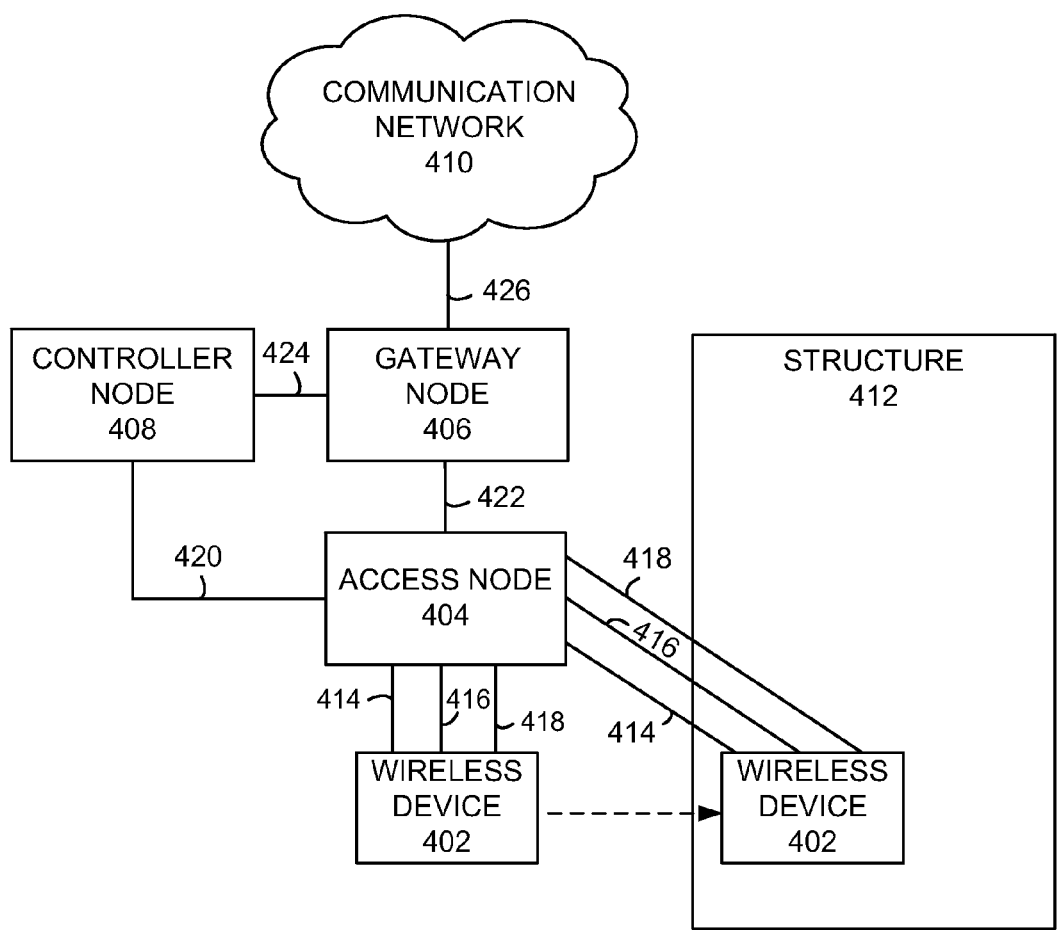
FIG. 4 illustrates another exemplary communication system to manage frequency band selection for a wireless device.

FIG. 4 illustrates another exemplary communication system 400 to manage frequency band selection for a wireless device comprising wireless device 402, access node 404, gateway node 406, controller node 408 and communication network 410. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication links 414, 416 and 418. Communication links 414, 416 and 418 can each correspond to a frequency band. In an embodiment, communication link 414 can correspond with a first frequency band, communication link 416 can correspond with a second frequency band at a lower frequency than the first frequency band, and communication link 418 can correspond with a third frequency band lower than the first frequency band and higher than the second frequency band.

Access node 404 is a network node capable of providing wireless communications to wireless device 402, and can be, for example, a base transceiver station, a radio base station, an eNodeB device, or an enhanced eNodeB device. Access node 404 is in communication with gateway node 406 over communication link 422 and with controller node 408 over communication link 420.

Gateway node 406 can comprise a processor and associated circuitry to execute or direct the execution of computer-readable instructions, and can be configured to manage frequency band selection for wireless device 402. Gateway node 406 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 406 can receive instructions and other input at a user interface. Examples of gateway node 406 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and network gateways, including combinations thereof. Gateway node 406 is in communication with controller node 408 over communication link 424 and with communication network 410 over communication link 426.

Controller node 408 can comprise can comprise a processor and associated circuitry to execute or direct the execution of computer-readable instructions, and can be configured to manage frequency band selection for wireless device 402. Controller node 408 can control the setup and maintenance of a communication session over communication network 410 by wireless device 402. Controller node 408 can comprise a mobile switching center (MSC), a dispatch call controller (DCC), a mobility management entity (MME), or other similar network node. Controller node 408 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 408 can receive instructions and other input at a user interface.

Communication network 410 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 can be capable of carrying voice information and other data, for example, to support communications by a wireless device such as wireless device 402. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 410 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 410 may also comprise a wireless network, including base stations, wireless communication nodes, telephony switches, internet routers, network gateways, computer systems, communication links, or some other type of communication equipment, and combinations thereof.

Communication links 414, 416, 418, 420, 422, 424 and 426 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404, gateway node 406, controller node 408, and communication network 410 which are omitted for clarity, including additional processing nodes, routers, gateways, and physical and/or wireless data links for carrying data among the various network elements.

Frequency bands 414, 416 and 418 may have different physical propagation characteristics. Higher frequency bands may also be more susceptible than lower frequency bands to path losses due to object interference, such as walls, partitions, and other objects. For example, when wireless device 402 enters (or passes behind) structure 412, which can be an area where higher frequency band penetration is impeded, signal levels of higher frequency bands can be determined to decrease more rapidly than signal levels of lower frequency bands. The relatively rapid fall off in higher frequency band signal levels can cause, for example, the degradation of service to or performance of wireless device applications which require a relatively high data rate or data throughput. In addition, wireless communication link load can be increased as a wireless device is assigned a lower modulation and coding scheme (MCS), which tends to decrease data throughput to the wireless device, and may also increase an amount of repetitive data transmitted as part of an error correction mechanism.

Figure 5:
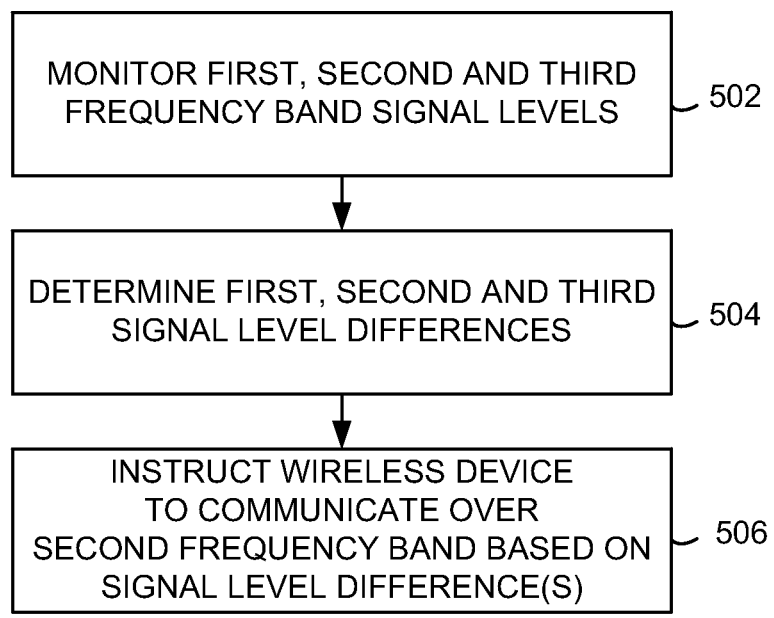
FIG. 5 illustrates another exemplary method of managing frequency band selection for a wireless device.
Figures 6A, 6B:
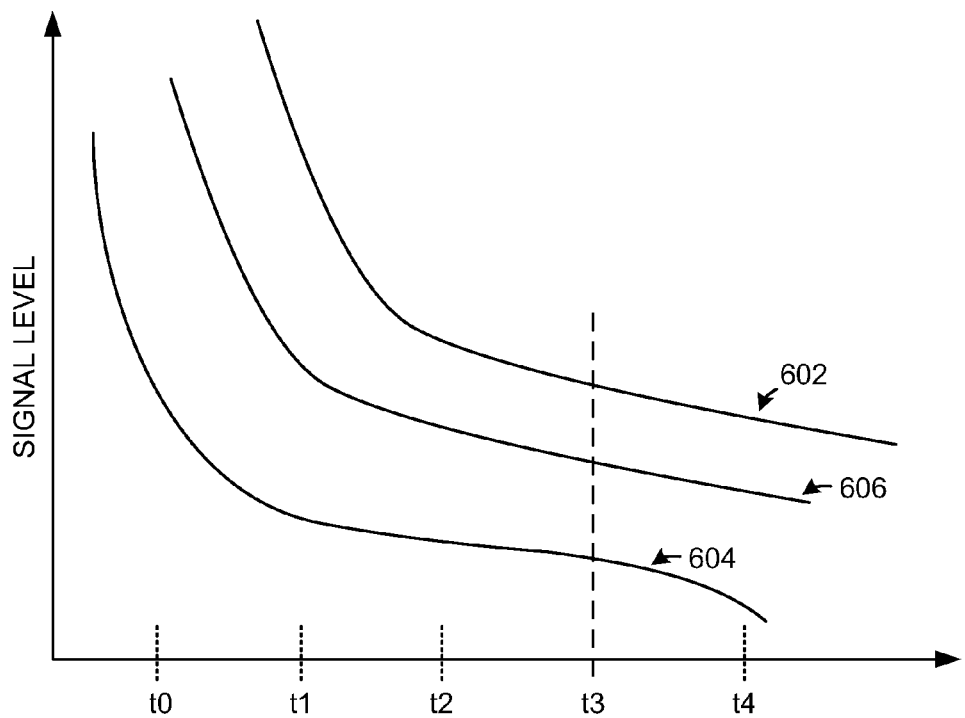
FIG. 6A illustrates exemplary power levels of frequency bands over time.
FIG. 6B illustrates exemplary signal levels of frequency bands.

FIG. 5 illustrates another exemplary method of managing frequency band selection for a wireless device. In operation 502, a first signal level of a first frequency band, a second signal level of a second frequency band, and a third signal level of a third frequency band are monitored, wherein the signal levels are received at a wireless device from an access node. The first frequency band can comprise a lower frequency band than the second frequency band, and the third frequency band can comprise a lower frequency band than the second frequency band and a higher frequency band than the second frequency bands. For example, with reference to FIG. 6A, a first signal level 602, a second signal level 604, and a third signal level 606 can be received at wireless device 402 and monitored. First signal level 602 can correspond with wireless communication link 414, second signal level 604 can correspond with wireless communication link 416, and third signal level 606 can correspond with wireless communication link 418. As illustrated in FIG. 6A, first signal level 602 can be greater than second signal level 604 and third signal level 606, and second signal level 604 can be lower than third signal level 606. First signal level 602 can correspond with a lower frequency band than second signal level 604 and third signal level 606, and third signal level 606 can correspond with a lower frequency level than second signal level 604. For example, signal level 602 can correspond with an 800 MHz frequency band, signal level 604 can correspond with a 2.5 GHz frequency band, and third signal level 606 can correspond with a 1.9 GHz frequency band. Signal levels 602, 604 and 606 are decreasing over time, as illustrated by the decreasing signal levels at times t0-t4. Such decreasing signal levels can indicate that wireless device 402 is experiencing fading conditions of wireless communication links 414, 416 and/or 418, possibly due to wireless device 402 moving away from access node 404, degrading radio frequency conditions, and the like.

Returning to FIG. 5, a signal level difference among signal levels the first, second and third frequency bands are determined (operation 504). For example, a first signal level difference between the first signal level and the second signal level can be determined. In addition, a second signal level difference between the second signal level and the third signal level can also be determined. Further, a third signal level between the first signal level and the third signal level can also be determined. In an embodiment, the signal level differences can be determined at a point in time. For example, referring to FIG. 6A, based on the determined respective signal levels, the first, second and third signal level differences can be determined at points in time t0, t1, t2, t3 and t4. FIG. 6B illustrates variations over time (i.e., rates of change) for the signal levels 602, 604 and 606 determined at times t0, t1, t2, t3 and t4, respectively. In an embodiment, signal levels 602, 604 and 606 can be monitored for a period of time, for example, for a period of time from point t0 to point t4.

Referring again to FIG. 5, in operation 506, the wireless device is instructed to communicate with the access node over the second frequency band when the first signal level difference meets a first signal level difference criteria based on a decrease of the second signal level. For example, based on a decrease in signal level 604 (FIG. 6A), wireless device 402 can be instructed to communicate with access node 404 over wireless communication link 416. Based on the signal levels determined at t0-t4 (FIGS. 6A and 6B) it can be determined (for example, at point t3) that the signal level difference meets a threshold signal level difference. For example, the first signal level difference at point t3 can be 4%, as compared to 1% at points t0-t2. The first signal level difference can also, for example, meet a threshold signal level rate of change as compared with previous time points. For example, the rate of change of the first signal level difference from points t3-t4 can be greater than the rate of change of the first signal level difference from points t0-t3. Further, the rate of change from points t3-t4 can meet a threshold rate of change.

In an embodiment, wireless device 402 can be instructed to communicate with access node 404 over the second frequency band when the first signal level difference meets a first signal level difference criteria and when the second signal level difference meets a second signal level difference criteria, each based on a decrease of the second signal level. For example, differences of the first signal level and the second signal level, and of the third signal level and the second signal level, can be monitored to determine when both signal level differences meet thresholds (which can be different thresholds). As another example, a rate of change of the difference of the first signal level and the second signal level, and a second rate of change of the difference of the second signal level and the third signal level, can be monitored to determine when both signal level differences meet threshold rates of change (which can be different threshold rates of change).

In an embodiment, wireless device 402 can be instructed to communicate with access node 404 over the second frequency band when the first signal level difference meets a first signal level difference criteria and when the third signal level difference meets a third signal level difference criteria, based on a decrease of the second signal level. For example, differences of the first signal level and the second signal level, and of the first signal level and the third signal level, can be monitored to determine when both signal level differences meet thresholds. In an embodiment, the third signal level difference can be compared with the first signal level difference to more accurately determine the first signal level difference meets a signal level difference threshold. As another example, a rate of change of the difference of the first signal level and the second signal level, and a second rate of change of the difference of the first signal level and the third signal level, can be monitored to determine when the rate of change of the first signal level meets a threshold rate of change.

Figure 7:
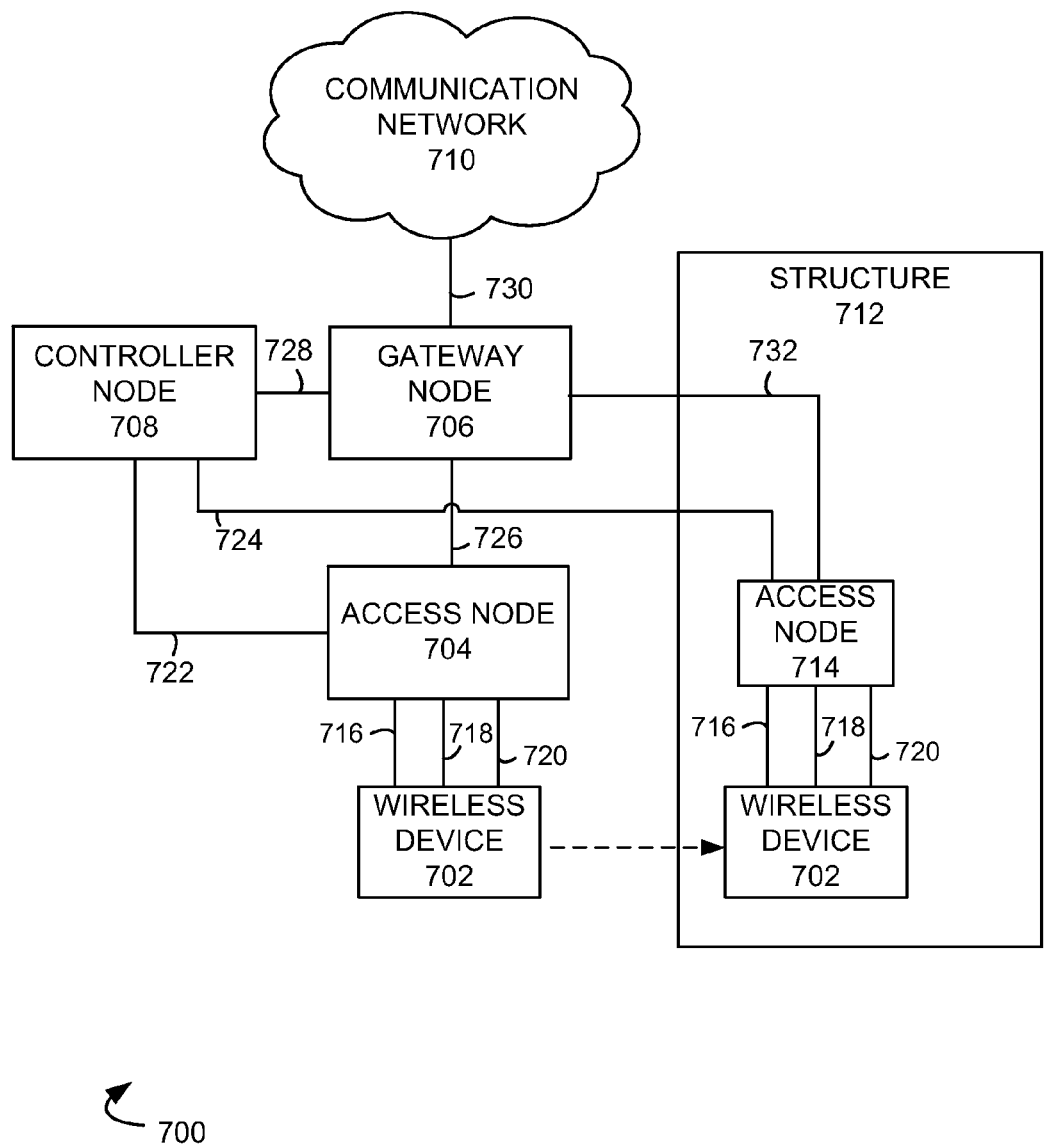
FIG. 7 illustrates another exemplary communication system to manage frequency band selection for a wireless device.

FIG. 7 illustrates another exemplary communication system 700 to manage frequency band selection for a wireless device comprising wireless device 702, access node 704, gateway node 706, controller node 708, communication network 410, and access node 714. Examples of wireless device 702 can comprise a cell phone, a smart phone, a computing platform such as a laptop, palmtop, or tablet, a personal digital assistant, or an internet access device, including combinations thereof. Wireless device 702 can communicate with access node 704 over communication links 716, 718 and 720. Communication links 716, 718 and 720 can each correspond to a frequency band. In an embodiment, communication link 716 can correspond with a first frequency band, communication link 718 can correspond with a second frequency band at a lower frequency than the first frequency band, and communication link 720 can correspond with a third frequency band lower than the first frequency band and higher than the second frequency band.

Access node 704 is a network node capable of providing wireless communications to wireless device 702, and can be, for example, a base transceiver station, a radio base station, an eNodeB device, or an enhanced eNodeB device. Access node 704 is in communication with gateway node 706 over communication link 726 and with controller node 708 over communication link 722.

Gateway node 706 can comprise a processor and associated circuitry to execute or direct the execution of computer-readable instructions, and can be configured to manage frequency band selection for wireless device 702. Gateway node 706 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 706 can receive instructions and other input at a user interface. Examples of gateway node 706 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and network gateways, including combinations thereof. Gateway node 706 is in communication with controller node 708 over communication link 728 and with communication network 710 over communication link 730.

Controller node 708 can comprise can comprise a processor and associated circuitry to execute or direct the execution of computer-readable instructions, and can be configured to manage frequency band selection for wireless device 702. Controller node 408 can control the setup and maintenance of a communication session over communication network 710 by wireless device 702. Controller node 708 can comprise a mobile switching center (MSC), a dispatch call controller (DCC), a mobility management entity (MME), or other similar network node. Controller node 708 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 708 can receive instructions and other input at a user interface.

Communication network 710 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 710 can be capable of carrying voice information and other data, for example, to support communications by a wireless device such as wireless device 702. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 710 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 710 may also comprise a wireless network, including base stations, wireless communication nodes, telephony switches, internet routers, network gateways, computer systems, communication links, or some other type of communication equipment, and combinations thereof.

Access node 714 is a network node capable of providing wireless communications to wireless device 702 over communication links 716, 718 and 720, corresponding to the first frequency band, the second frequency band, and the third frequency band, respectively. In an embodiment, the first, second and third frequency bands can each use a cellular radio access technology, examples of which include LTE, WiMAX, CDMA, and the like. Access node 714 is substantially disposed within structure 712, and can comprise a coverage area which is itself within a coverage area of access node 704. Examples of access node 714 can include a base transceiver station, a radio base station, an eNodeB device, an enhanced eNodeB device, or other similar access node, including a so-called femtocell device, picocell device, and the like, which can be used to enhance or supplement network coverage of communication system 700. Access node 714 is in communication with controller node 708 over communication link 722 and with gateway node 706 over communication link 730.

Communication links 716, 718, 720, 722, 724, 726, 728, 730 and 732 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 700 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 704, gateway node 706, controller node 708, access node 714, and communication network 710 which are omitted for clarity, including additional processing nodes, routers, gateways, and physical and/or wireless data links for carrying data among the various network elements.

Frequency bands 716, 718 and 720 may have different physical propagation characteristics. Higher frequency bands may also be more susceptible than lower frequency bands to path losses due to object interference, such as walls, partitions, and other objects. For example, when wireless device 702 enters structure 712, which can be an area where higher frequency band penetration is impeded, signal levels of higher frequency bands can be determined to decrease more rapidly than signal levels of lower frequency bands. The rapid fall off in higher frequency band signal levels can cause, for example, the degradation of service to or performance of wireless device applications which require a relatively high data rate or data throughput. In addition, wireless communication link load can be increased as a wireless device is assigned a lower modulation and coding scheme (MCS), which tends to decrease data throughput to the wireless device, and may also increase an amount of repetitive data transmitted as part of an error correction mechanism.

Figure 8:
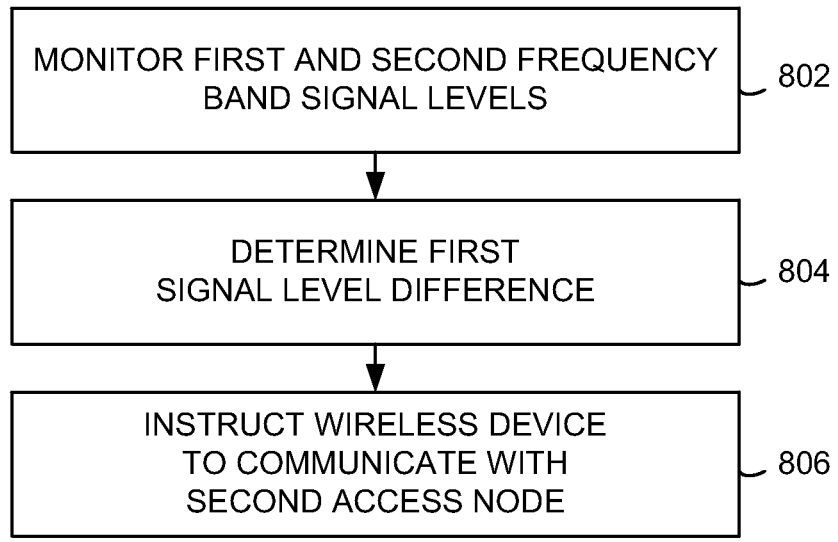
FIG. 8 illustrates another exemplary method of managing frequency band selection for a wireless device.

FIG. 8 illustrates another exemplary method of managing frequency band selection for a wireless device. In operation 802, a first signal level of a first frequency band, a second signal level of a second frequency band, wherein the signal levels are received at a wireless device from an access node. The first frequency band can comprise a lower frequency band than the second frequency band. In an embodiment, a third signal level of a third frequency band can also be monitored, and the third frequency band can comprise a lower frequency band than the second frequency band and a higher frequency band than the second frequency bands. For example, the first signal level can correspond with an 800 MHz frequency band, and the second signal level can correspond with a 2.5 GHz frequency band. In an embodiment, the third signal level can correspond with a 1.9 GHz frequency band.

In operation 804 a signal level difference of the first and second frequency bands are determined. For example, a first signal level difference between the first signal level and the second signal level can be determined. In an embodiment, a second signal level difference between the second signal level and the third signal can also be determined. Further, in an embodiment, a third signal level between the first signal level and the third signal level can also be determined. The signal level differences can be determined at a point in time. For example, referring to FIG. 6A, based on the determined respective signal levels, the first, second and third signal level differences can be determined at points in time t0, t1, t2, t3 and t4. FIG. 6B illustrates signal levels determined at times t0, t1, t2, t3 and t4, for signal levels 602, 604 and 606, respectively. In an embodiment, signal levels 602, 604 and 606 can be monitored for a period of time, for example, for a period of time from point t0 to point t4.

Referring again to FIG. 8, in operation 806, the wireless device is instructed to communicate with a second access node over the second frequency band when the first signal level difference meets a first signal level difference criteria based on a decrease of the second signal level. For example, based on a decrease in signal level 604 (FIG. 6A), wireless device 702 can be instructed to communicate with access node 7144 over wireless communication link 718. Based on the signal levels determined at t0-t4 (FIGS. 6A and 6B) it can be determined (for example, at point t3) that the signal level difference meets a threshold signal level difference. For example, the first signal level difference at point t3 can be 4%, as compared to 1% at points t0-t2. The first signal level difference can also, for example, meet a threshold signal level rate of change as compared with previous time points. For example, the rate of change of the first signal level difference from points t3-t4 can be greater than the rate of change of the first signal level difference from points t0-t3. Further, the rate of change from points t3-t4 can meet a threshold rate of change.

In an embodiment, wireless device 702 can be instructed to communicate with access node 714 over the second frequency band when the first signal level difference meets a first signal level difference criteria and when the second signal level difference meets a second signal level difference criteria, each based on a decrease of the second signal level. For example, differences of the first signal level and the second signal level, and of the third signal level and the second signal level, can be monitored to determine when both signal level differences meet thresholds (which can be different thresholds). As another example, a rate of change of the difference of the first signal level and the second signal level, and a second rate of change of the difference of the second signal level and the third signal level, can be monitored to determine when both signal level differences meet threshold rates of change (which can be different threshold rates of change).

In an embodiment, wireless device 702 can be instructed to communicate with access node 714 over the second frequency band when the first signal level difference meets a first signal level difference criteria and when the third signal level difference meets a third signal level difference criteria, based on a decrease of the second signal level. For example, differences of the first signal level and the second signal level, and of the first signal level and the third signal level, can be monitored to determine when both signal level differences meet thresholds. In an embodiment, the third signal level difference can be compared with the first signal level difference to more accurately determine the first signal level difference meets a signal level difference threshold. As another example, a rate of change of the difference of the first signal level and the second signal level, and a second rate of change of the difference of the first signal level and the third signal level, can be monitored to determine when the rate of change of the first signal level meets a threshold rate of change.

Figure 9:
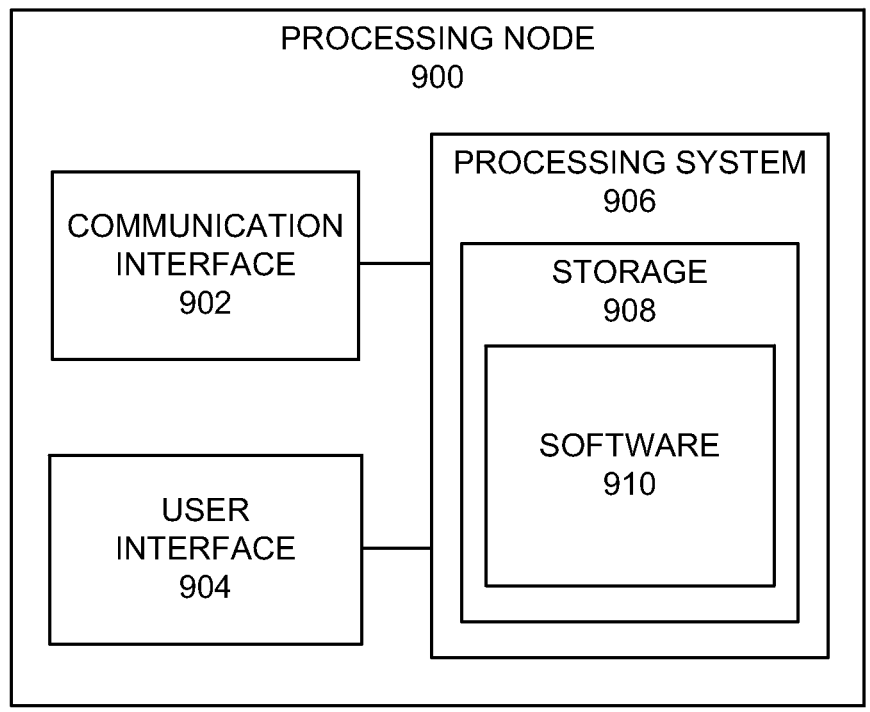
FIG. 9 illustrates an exemplary processing node.

FIG. 9 illustrates an exemplary processing node 900 in a communication system. Processing node 900 comprises communication interface 902, user interface 904, and processing system 906 in communication with communication interface 902 and user interface 904. Processing node 900 can be configured to manage frequency band selection for a wireless device. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 include gateway node 406, controller node 408, gateway node 706, and controller node 708. Processing node 900 can also be an adjunct or component of a network element, such as an element of access node 104, access node 404, access node 704 and access node 714. Processing node 900 can also be another network element in a communication system. Further, the functionality of processing node 900 can be distributed over two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing frequency band selection for a wireless device, comprising:
    monitoring a first signal level of a first frequency band a second signal level of a second frequency band, and a third signal level of a third frequency band, wherein the first frequency band comprises a lower frequency band than the second and third frequency bands;
    determining a first signal level difference between the first and the second signal levels;
    determining a second signal level difference between the second and the third signal levels; and
    instructing the wireless device to communicate with the access node over the second frequency band when a rate of change of the first signal level difference and a rate of change of the second signal level difference meet a criteria based on a decrease of the second signal level.

2. The method of claim 1, further comprising:
    instructing the wireless device to communicate over the second frequency band when the second signal level meets a signal level threshold and when the first signal level difference meets a first signal level difference criteria based on a decrease of the second signal level; and
    instructing the wireless device to communicate over the second frequency band when the second signal level difference meets a second signal level difference threshold based on a decrease of the second signal level.

3. The method of claim 2, wherein the criteria comprises a threshold rate of change over a predetermined period of time.

4. The method of claim 2, wherein the third frequency band comprises a lower frequency band than the second frequency band and a higher frequency band than the first frequency band.

5. The method of claim 4, further comprising:
    determining a third signal level difference between the first signal level and the third signal level.

6. The method of claim 4, further comprising:
    determining a third signal level difference between the first signal level and the third signal level; and
    instructing the wireless device to communicate over the second frequency band when a ratio of the first signal level difference to the second signal level difference meets a criteria based on a decrease of the second signal level.

7. The method of claim 4, further comprising:
    determining a third signal level difference between the first signal level and the third signal level; and
    instructing the wireless device to communicate over the second frequency band when the first signal level difference is a predetermined percentage greater than the second signal level difference based on a decrease of the second signal level.

8. The method of claim 4, further comprising:
    determining a third signal level difference between the first signal level and the third signal level; and
    instructing the wireless device to communicate over the second frequency band when the first signal level difference is a predetermined ratio greater than the second signal level difference based on a decrease of the second signal level.

9. The method of claim 1, further comprising determining that the wireless device is indoors when the first signal level difference meets a first signal level difference threshold based on a decrease of the second signal level.

10. A system of managing frequency band selection for a wireless device, comprising:
    a processing node configured to:
        monitor a first signal level of a first frequency band, a second signal level of a second frequency band, and a third signal level of a third frequency band, wherein the first frequency band comprises a lower frequency band than the second and third frequency bands;
        determine a first signal level difference between the first and the second signal levels;
        determine a second signal level difference between the second and the third signal levels; and
        instruct the wireless device to communicate with the access node over the second frequency band when a rate of change of the first signal level difference and a rate of change of the second signal level difference meet a criteria based on a decrease of the second signal level, wherein the criteria comprises a threshold rate of change over a predetermined period of time.

11. The system of claim 10, wherein the processing node is further configured to:
    instruct the wireless device to communicate over the second frequency band when the second signal level difference meets a second signal level difference threshold based on a decrease of the second signal level.

12. The system of claim 11, wherein the processing node is further configured to:
    determine a third signal level difference between the first signal level and the third signal level, wherein the third signal level of the third frequency band comprises a lower frequency band than the second frequency band and a higher frequency band than the first frequency band.

13. The system of claim 11, wherein the processing node is further configured to:
   determine a third signal level difference between the first signal level and the third signal level; and
   instruct the wireless device to communicate over the second frequency band when a ratio of the first signal level difference to the second signal level difference meets a criteria based on a decrease of the second signal level.

14. The system of claim 11, wherein the processing node is further configured to:
   determine a third signal level difference between the first signal level and the third signal level; and
   instruct the wireless device to communicate over the second frequency band when the first signal level difference is a predetermined percentage greater than the second signal level difference based on a decrease of the second signal level.

* * * * *